US010710690B2

(12) United States Patent
Julliand et al.

(10) Patent No.: US 10,710,690 B2
(45) Date of Patent: Jul. 14, 2020

(54) POWER SYSTEM FOR A MARINE VEHICLE, COMPRISING A PROPULSION UNIT, A RUDDER BEARING AND FITTINGS

(71) Applicant: GE ENERGY POWER CONVERSION TECHNOLOGY LTD, Rugby, Warwickshire (GB)

(72) Inventors: Lionel Julliand, Belfort (FR); Thierry Deschamps, Belfort (FR); Laurent Barth, Belfort (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 0 days.

(21) Appl. No.: 16/310,610

(22) PCT Filed: Jun. 13, 2017

(86) PCT No.: PCT/EP2017/064453
§ 371 (c)(1),
(2) Date: Dec. 17, 2018

(87) PCT Pub. No.: WO2017/216189
PCT Pub. Date: Dec. 21, 2017

(65) Prior Publication Data
US 2019/0185123 A1 Jun. 20, 2019

(30) Foreign Application Priority Data

Jun. 17, 2016 (FR) ...................................... 16 55659

(51) Int. Cl.
*B63H 5/125* (2006.01)
*F16C 19/10* (2006.01)
(Continued)

(52) U.S. Cl.
CPC ............. *B63H 5/125* (2013.01); *F16C 19/10* (2013.01); *F16C 19/30* (2013.01); *F16C 35/042* (2013.01);
(Continued)

(58) Field of Classification Search
CPC . B63H 5/125; B63H 2005/1258; F16C 19/10; F16C 19/30; F16C 35/042
See application file for complete search history.

(56) References Cited

U.S. PATENT DOCUMENTS

2007/0123118 A1* 5/2007 White ................... B63H 20/06
440/75

FOREIGN PATENT DOCUMENTS

EP 2662278 A1 11/2013
WO 2009126096 A1 10/2009

OTHER PUBLICATIONS

International Search Report and Written Opinion dated Oct. 4, 2017 which was issued in connection with PCT application No. PCT/EP2017/064453 which was filed on Jun. 13, 2017.
(Continued)

*Primary Examiner* — Stephen P Avila
(74) *Attorney, Agent, or Firm* — Wood IP LLC

(57) ABSTRACT

This power system for mounting on a marine vehicle includes a propulsion unit, means for securing the propulsion assembly to a hull element of the vehicle and a rudder bearing mechanically connecting the propulsion unit with the fittings. The fittings are configured so that once the power system is mounted on the hull element; the plane of the rudder bearing is inclined relative to a plane containing one longitudinal axis and one transverse axis of the marine vehicle.

11 Claims, 3 Drawing Sheets

(51) Int. Cl.
*F16C 19/30* (2006.01)
*F16C 35/04* (2006.01)
(52) U.S. Cl.
CPC .. *B63H 2005/1258* (2013.01); *F16C 2300/14* (2013.01); *F16C 2326/30* (2013.01)

(56) References Cited

OTHER PUBLICATIONS

French Search Report and Written Opinion dated Feb. 27, 2017 which was issued in connection with French patent No. FR1655659 which was filed on Jun. 17, 2016.

* cited by examiner

POWER SYSTEM FOR A MARINE VEHICLE, COMPRISING A PROPULSION UNIT, A RUDDER BEARING AND FITTINGS

BACKGROUND OF THE DISCLOSURE

This invention concerns propulsion units of marine vehicles, such as ships, submarines or even oil platforms.

These propulsion units, also known by the name "propulsion-oriented drive", or "POD", generally include a mobile housing mounted with a pivot link to a hull element of the marine vehicle. For example, the hull element may be placed at the stern or prow of a ship.

In order to provide the pivot link between the mobile housing and the hull element, a rudder rotating bearing can be mounted inside and attached to the hull element.

During the drive unit installation, a direction cone is installed from the inside of the hull element. The upper end of the direction cone is fastened on the rudder bearing. The mobile housing is afterwards introduced from the outside of the hull element, so that its upper end is connected to the lower end of the direction cone. Then, the upper end of the mobile housing is connected to the lower end of the direction cone.

Then, to avoid sea water infiltration inside the hull element and various leaks such as hydraulic fluid or air leaks, sealing gaskets are placed between the hull element and a wall of the drive unit housing, located in its proximity.

Although the use of a direction cone allows sturdy fastening of the drive unit at the rudder bearing, it still has certain disadvantages.

Among these disadvantages, the use of a direction cone results in the rudder bearing position which is relatively far from the sealing gaskets. It leads to the occurrence of a leverage effect when the drive unit is shifting slightly in the vertical plane, when forces are applied to the lower part of the propulsion unit. This leverage effect multiplies the mechanical restrictions applied at the rudder bearing and increases the efforts exerted on the seals.

On the other hand, another disadvantage is that the hull element on which the drive unit is mounted is often directed according to an inclined plane as compared to the horizontal plane of the vehicle. For example, two drive units can be mounted on two elements of the ship hull, on each side and at its stern. In this example, each hull element is locally oriented according to a median inclined plane, as compared with the horizontal plane defined relative to the position of the ship, according to the pitch and roll directions. The two drive units, which include an identical mobile housing, have an unoptimized profile at the hydrodynamic level.

In order to overcome this disadvantage, it might be possible to adapt the housing shape to the shell element on which the drive unit is to be mounted. However, this solution is very expensive both in terms of design as well as manufacturing costs.

Another solution may consist of adding a hydrodynamic adaptation part, also called a "head box", between the drive unit housing and the hull element. This adaptation part has a hydrodynamic shape adapted to the inclination of the local plane of the hull element compared with a horizontal plane. However, this kind of solution still has some disadvantages, because this adaptation part has an additional hydrodynamic resistance and generates further costs related to manufacturing.

BRIEF SUMMARY

In view of the above, the invention aims to propose an assembly including, in particular, a drive unit for a marine vehicle, overcoming the above-mentioned disadvantages.

In particular, the object of the invention relates to easily mounting and dismounting the drive unit while improving its hydrodynamic properties and limiting the mechanical stresses on the rudder bearing as well as the wear and tear on the sealing gaskets.

For this purpose, a power system is intended to be mounted on a marine vehicle, comprising a drive unit, fittings for the power system on a hull element of the vehicle and a rudder bearing mechanically connecting the drive unit to the fittings.

According to a general characteristic of this power system, the fittings are configured so that once the power system is mounted on the hull element; the plane of the rudder bearing is inclined relative to a plane containing one longitudinal and one transverse axis of the marine vehicle.

Such a power system, including both the mobile housing and the rudder bearing, is particularly compact. Therefore, the delivery, mounting and dismounting of the power system on a marine vehicle are facilitated. Furthermore, the rudder bearing can be oriented significantly parallel to a median plane of the hull element, and placed nearby. The result is better hydrodynamic properties and a reduction of the leverage effect that occurs while the drive unit undergoes movements following forces directed in a longitudinal or transverse direction compared to the marine vehicle.

According to an embodiment, the fittings include a strut in the form of a cylinder trunk comprising a first plane end, perpendicular to its axial direction, and a second plane end, inclined relative to its axial direction, the spacer being fixed to the rudder bearing at its second end.

Conveniently, the shortest distance between the first and the second ends is between 400 mm and 1,200 mm.

One can otherwise anticipate that the strut has, at its first end, a ring front face designed to be attached to a fixing flange integral with the vehicle hull element.

Conveniently, the ring front face has several bores spaced apart in circumferential direction, the fittings comprising several bolts being inserted into the bores of the ring front face and intended to fit into the clamp's corresponding perforations.

The strut includes a fastening flange at its second end attached to an inner ring or an outer ring of the rudder bearing by means of several studs with a threaded end inserted into corresponding holes.

In an alternative way, the fastening flange can be assembled on the inner or the outer ring using several screws with their corresponding nuts.

In another embodiment, the rudder bearing has an inner and an outer ring, one of the rings being attached to the drive unit, the other rings being attached to the fittings, the rudder bearing having also a sealing gasket radially located between the inner and outer ring and axially offset from the inner ring, the axial offset measuring less than twice the length of the inner ring.

One can also predict that the steering bearing has an inner and an outer ring, the inner ring being attached to the drive unit, and the outer ring being attached to the fittings.

In one embodiment, the drive unit has a frontal upper surface with forepart coming in contact with the inner ring, the inner ring having several through holes, the frontal upper surface having several blind holes, each blind hole being placed opposite a continuous through hole, several screws being introduced into the through holes and blind holes in order to fasten the rudder bearing to the drive unit.

The rudder bearing plane has an angle of between 2° and 10° relative to the plane containing the longitudinal axis and the transverse axis of the vehicle.

From another point of view, an assembly method is provided for a power system as previously defined on a hull element of a marine vehicle, in which the power system is inserted from the outside of the hull element, then implementing the fittings to fasten the power system to the hull element.

BRIEF DESCRIPTION OF THE DRAWINGS

Other purposes, characteristics of the invention will be revealed while reading the following description, given only as a non-limiting example, and related to the attached drawings, in which.

DETAILED DESCRIPTION

Figure 1:
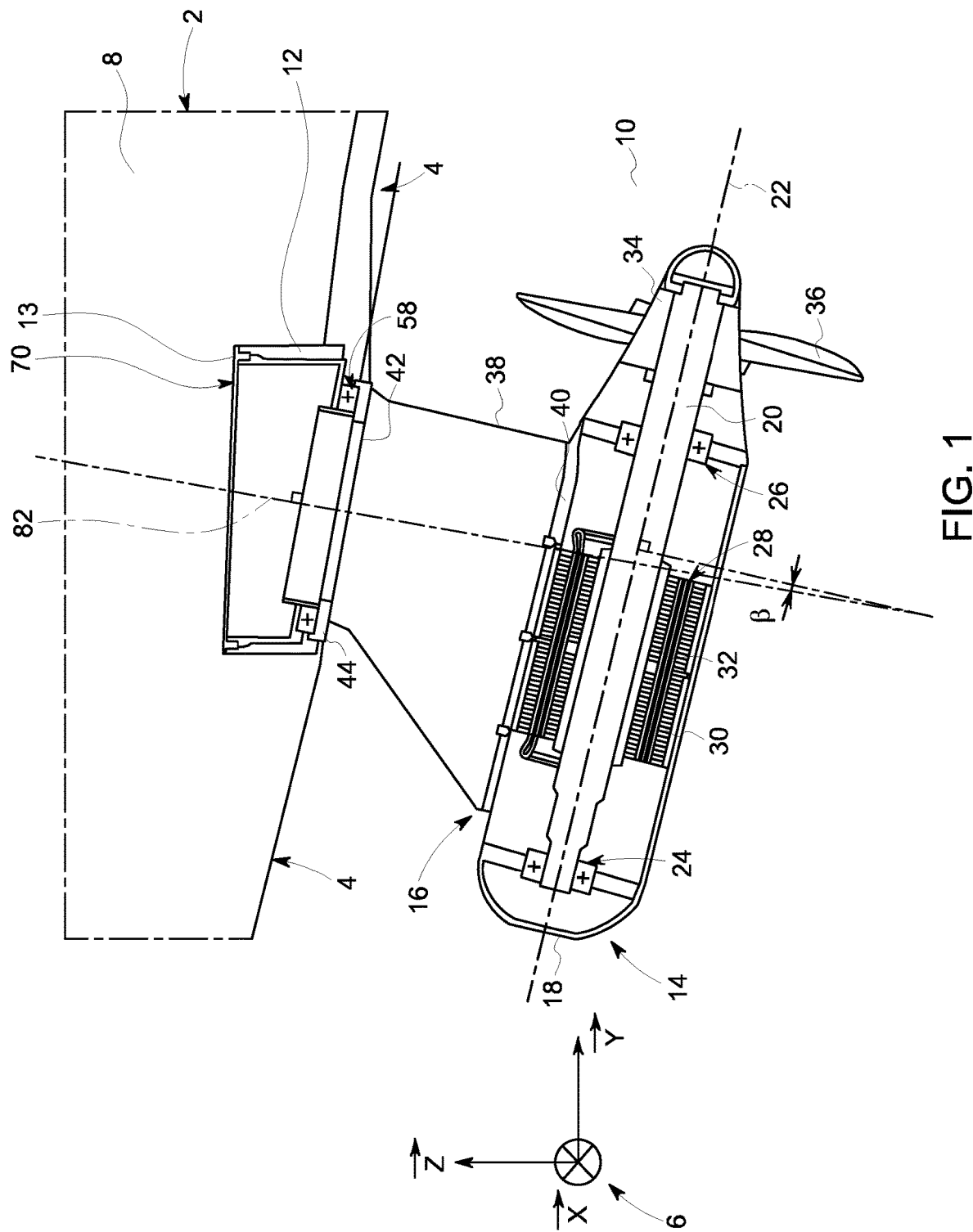
FIG. 1 is a cross-axial section of a power system according to an example embodiment of the invention.

With reference to FIG. 1, it represents the stern 4 of a ship 2. A system of vectors 6 is defined relative to the ship 2. The system 6 consists of three orthogonal vectors, and. The vector is perpendicular to the plane of FIG. 1 and led by the pitch axis of the ship 2, while ship 2 is arranged according to a normal operating plane. A normal operation plane is the one containing longitudinal and transverse directions of the ship 2, while the latter moves on a calm sea and under normal loading conditions. The vector is horizontal relative to the plane of FIG. 1 and oriented according to the roll axis of the ship 2, while the ship 2 is arranged according to a normal operating plane. The vector is vertical relative to FIG. 1 and oriented according to the yaw axis of the ship 2, while the ship 2 is arranged according to a normal operating plane. Also as defined by FIG. 1, compared with the hull element 4, an inner part 8 and an outer part 10.

The hull element 4 has a bore leading on which a cylindrical seat 12 is mounted. The seat 12 is encased in the hull element 4 through fittings (not shown). For example, the seat 12 can be assembled with the hull element 4 using bolts, welding points or seams or by press fitting. The axis of the cylindrical seat 12 is substantially parallel to a vertical direction defined relative to the ship 2 and represented in FIG. 1 by the vector. The cylindrical seat 12 has a clamp 13 of a substantially ring or oval form and perpendicularly oriented to the axial direction of the seat 12 schematically represented by the vector.

The ship 2 represented by FIG. 1 has a power system mounted on the hull element 4.

The power system includes a drive unit 14 and one rudder bearing 58. The drive unit 14 protrudes outward from the hull element 4. In other words, the drive unit 14 is mainly located in the outer part 10 of the hull element 4. By means of the rudder bearing 58, the drive unit 14 includes a mobile housing 16 able to pivot around an axis, relative to the hull element 4.

The mobile housing 16 has a lower part 18 substantially shaped as an oblong cylindrical tube. Inside the lower part 18, a propeller shaft 20 is mounted so that it can rotate relative to the mobile housing 16. In particular, the propeller shaft 20 is able to rotate about its own axis 22. To do this, the lower part 18 has two pivot bearings 24 and 26 oriented perpendicular to the direction of the propeller shaft 22 and mechanically linking the lower part 18 to the propeller shaft 20.

To generate the rotation of the propeller shaft 20 relative to the mobile housing 16, an electrical engine 28 is located inside the lower part 18. The electric engine 28 includes a stator 30 mounted on the lower part 18 and a rotor 32 mounted on the propeller shaft 20.

The propeller shaft 20 rotates a propeller support 34 on which a propeller 36 is mounted. Although, in the embodiment presented with reference to the figures, the drive unit includes a propeller, it might also include, within the context of the invention, a totally different drive element, for example a pump rotor.

According to the embodiment of the invention as shown, the propeller 36 is mounted on one end in front of the drive unit, from the marine vehicle. The propeller 36 is therefore upstream of the mobile housing 16 in the seawater flow circulating around the drive unit 14, while the marine vehicle 2 moves normally. In other words, the propeller 36 works in traction. However, one can consider, in the context of the invention, to have the propeller placed on the opposite end, such that it works on thrust. Such an alternative is different from the illustrated example mostly because the position is reversed, on the driven end of the drive unit, on which the propeller support 34 is mounted, and of the other non-driven end of the drive shaft 20.

The mobile housing 16 has an upper part 38. The upper part 38 is mechanically connected to the lower part 18 in the vicinity of a proximal end 40. For example, the upper and the lower part can be assembled using bolts, weld points and/or seams (not shown). The upper part 38 and the lower part 18 may also be two parts of a single cast part.

Figure 2:
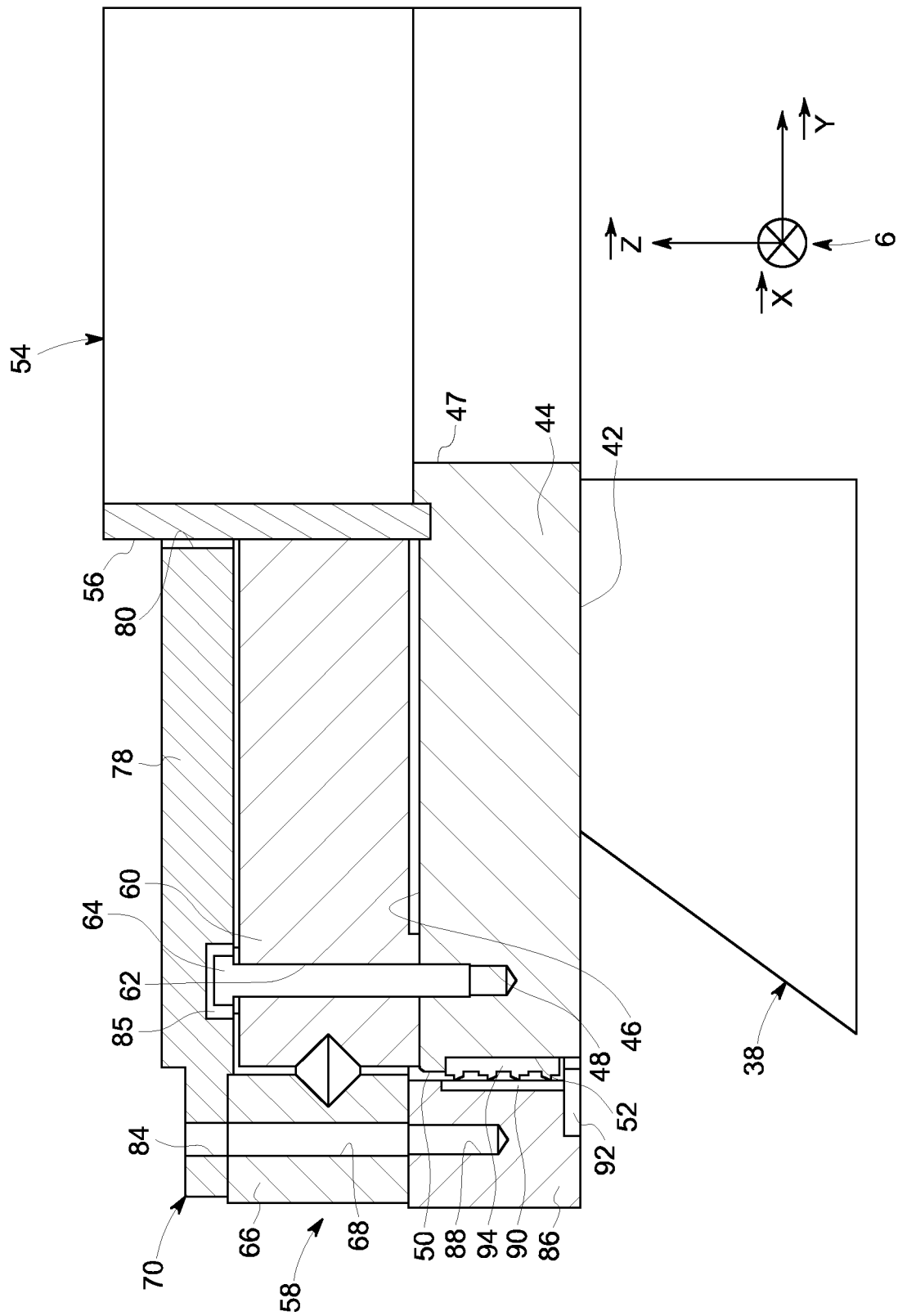
FIG. 2 is a detailed view of FIG. 1.

FIG. 2 shows a detailed view of the upper part of the mobile housing 16 and the rudder bearing 58. With reference to FIGS. 1 and 2, the mobile housing 16 upper part 38, includes a distal end 42 against the lower part 18, the distal end 42 being opposed to the proximal end 40. At the level of its distal end 42, the upper part 38 has a washer part 44. The washer part 44 has a bore 47 in its center. The bore 47 is designed to allow the passage of controls or power elements, such as cables or hydraulic lines (not shown), used to transmit operating or power signals between the inside and outside of the mobile housing 16 of the drive unit.

The washer part 44 is axially bounded by an upper frontal surface 46 including several blind holes 48. The blind holes 48 are circumferentially distributed, being regularly spaced around the axis of the washer part 44. A tapping (not shown) is provided on the cylindrical wall of each blind hole 48. The washer part 44 is radially bounded by an outer cylindrical surface 50, which includes a shoulder 52.

The upper part 38 includes, at its distal end 42, an end cylinder 54. The end cylinder 54 is embedded in the washer part 44, for example by press fitting or by welding. The end cylinder 54 has an outer cylindrical surface 56.

The power system otherwise has a rudder bearing 58, as schematically represented in FIGS. 1 and 2. In the described example embodiment, the rudder bearing 58 is a friction bearing, e.g. of the shell type. However, the invention is not limited to such a bearing, being perfectly possible to consider, within the context of the invention, the use of another bearing type, for example a rolling bearing like a ball bearing, a conical bearing or a roller bearing.

With regard to FIG. 2, the bearing 58 has an inner ring 60. The inner ring 60 has several through holes 62; each of them is intended to be placed next to a blind hole 48 on the washer part 44. Therefore, through holes 62 on the inner ring 60 as well as blind holes 48 on the part 44 are conveniently provided. The through holes 62 are distributed circumferentially and evenly around the inner ring axis 60. The through holes 62 extend according to the axial direction of the inner ring 60. The inner ring 60 is normally placed relative to the washer part 44 so that it comes into contact with the frontal area 46, and so that the through holes 62 are axially placed, each next to a blind hole 48. For each through hole 62, a screw 64 is provided, that can be inserted in the respective through hole 62 and the blind hole 48 located next to this through hole 62. The screw 64 threads are suitable for fitting with the tapping of the blind hole 48. Through this provision, the inner ring 60 can be easily attached to the mobile housing 16.

The rudder bearing 58 has an outer ring 66. The outer ring 66 is radially bounded by an (unreferenced) inner cylindrical surface in contact, or almost in contact, with an (unreferenced) outer cylindrical surface of the inner ring 60. A lubrication device (not shown) can be provided to allow injection of a fluid hydraulic between the rings 60 and 66. The outer ring 66 has several through holes 68. The through holes 68 extend according to the axial direction of the ring 66 and are distributed circumferentially and evenly around this axial direction.

Figure 3:
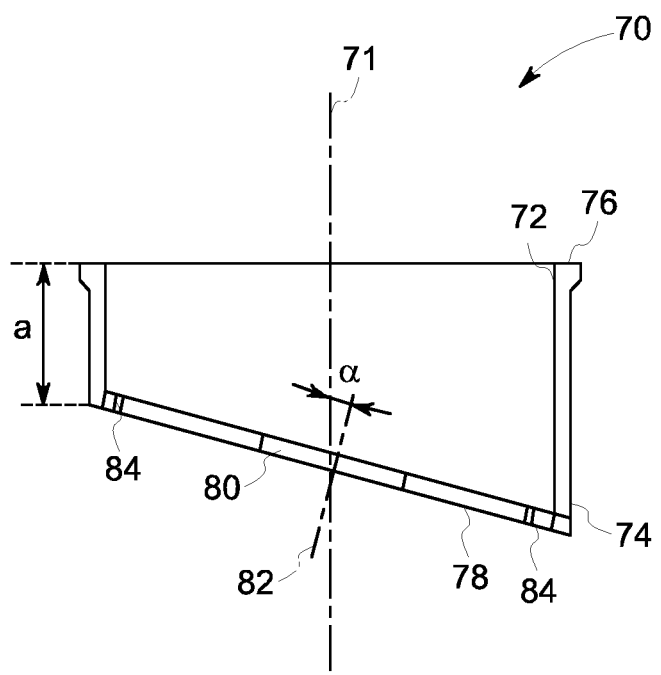
FIG. 3 shows the strut of the power system of FIG. 1.

The power system has a spacer 70, notably represented in detail in the front view of FIG. 3. The spacer 70 is cylindrical, and its axis 71 is substantially parallel to the vertical direction defined in terms of the ship 2, symbolized by the vector. The spacer 70 stretches axially between a first end 72 and a second end 74.

At the end level 72, the spacer 70 has a ring front face 76 substantially perpendicular to the axial direction 71. The front face 76 is intended to provide support against the clamp 13 of the cylindrical seat 12, as shown in FIG. 1. Fitting such as bolts, welding points and/or welding seams allow to firmly fix the spacer 13 on the clamp 70.

At the end level 74, the spacer 70 has a fastening flange 78, extending radially inward from the cylindrical part of the spacer 70. In its center, the fastening flange 78 includes a though bore 80 of the axis 82. As shown in FIG. 2, the bore 80 is expected for the passage of the end cylinder 54. The fastening flange 78 includes a flat frontal surface substantially perpendicular to the axis 82.

In this way, the spacer 70 has substantially the shape of a cylinder trunk. In other words, the spacer 70 is a cylinder delimited lengthwise by a first plane perpendicular to the axial direction of the cylinder, and delimited by an angled second plane, not perpendicular to the cylinder axis.

As shown in FIGS. 2 and 3, the flange 78 has several through holes 84 directed according to the axial direction relative to the axis 82. In particular, there are as many perforations 84 on the fixing flange 78 as through holes 68 on the outer ring 66 of the bearing 58. The perforations 84 are distributed circumferentially and evenly around the axis 82 so that they can be arranged next to the through holes 68 respectively. Furthermore, the fastening flange 78 has an annular groove 85, provided to allow the crossing and movement of the bolt heads 64.

Again with reference to FIG. 2, a ring locking element 86 is provided to be placed in contact with the outer ring 66 of the rudder bearing 58. The locking element 86 includes several blind holes 88. The blind holes 88 include a tapping (not shown) on their inner cylindrical surface. In particular, the locking element 86 has as many blind holes 88 as through holes 68 on the outer ring 66 of the bearing 58. The blind holes 88 are distributed circumferentially and evenly around the axis of the ring item 86 so they can be arranged next to the through holes 68 respectively.

Through this provision, it is possible to secure the end 74 of the spacer 70 to the outer ring 66 of the bearing 58. To do this, a stud (not shown) with a threaded end (not shown) is introduced into each perforation 84 and the holes 68 and 88 located next to such perforation. The thread on the stud ends is suitable for tapping blind holes 88. Therefore, by tightening the studs, the fastening flange 78, the outer ring 66 and the locking element 86 are held together.

The locking element 86 also contains an inner cylindrical surface (unreferenced) with a contact surface 90 held in position by a washer 92. A gasket 94 is intercalated between the shoulder 52 of the outer cylindrical surface 50 and the contact surface 90. The contact surface 90 consists of materials chosen so that the gasket 94 can ensure a seal by sliding contact. The sizes of the rings 60 and 66, of the locking element 86 and of the part 44 are such that the gasket is radially arranged between the inner ring 60 and the outer ring 66, and axially offset, against the respective rings 60, 66, in the direction of the propulsion unit 14.

The number of bore triplets or holes, 84, 68, 88, which correspond to the number of studs (not shown), may be chosen to allow a satisfactory fastening of the outer ring 66 of the rudder bearing to on the fastening flange 78 of the spacer 70. Similarly, the length of the studs is chosen so as to ensure a sufficient grip. We use a number of studs chosen so that the spacing between two consecutive studs is between 80 and 250 mm. Conveniently, the stud length is between 1.2 and 4 times the bearing width. In the example of the detailed embodiment with reference to the figures, in which the bearing has an outside perimeter of 3.80 m and a width according to the direction of the vector of approx. 150 cm, several studs between 50 and 150 cm are used, the studs having a length of between 200 and 400 mm.

The smallest distance between the ends 72 and 74 of the spacer 70 is enough to allow a technician to work on the end 72 with the feet at the height of the end 74, and so that welding or bolt tightening operations can be performed easily. In the illustrated embodiment example, this distance, which is referenced by the letter "a" in FIG. 3, is between 400 and 1,200 mm, and more conveniently between 600 and 700 mm.

With reference to FIGS. 1 and 3, the axis 82 has an angle $\alpha$, relative to the axis 71. In this way, the rudder bearing 58 plane is tilted, at the same angle $\alpha$, relative to the plane perpendicular to the vector. It is possible, by adjusting only the spacer 60, to change the position and orientation of the governor bearing 58 so that it is the most adapted possible at a local level of the hull element 4. Moreover, the direction of the axis 82 has an angle $\beta$ to the radial direction of the propeller axis 22. By changing the shape of the spacer 70 and the shape of the mobile housing 14, the angle formed by the propeller axis 22 with the vertical direction set relative to the ship, led by the vector, can be chosen conveniently.

Conveniently, the angles $\alpha$ and $\beta$ are determined depending on the profile of the shell element 4 and the hull of the ship near the hull element 4, in order to achieve a propulsion which is, at once, particularly suitable for seawater traffic lines near the hull element 4, and whose profile presents optimal hydrodynamic properties. In the embodiment example shown, the angle $\alpha$ is between 2° and 10° and the angle $\beta$ is between 0° and 10°.

Through the power system just described, it is possible to implement the following installation method of the power system on the shell element 4 of the ship 2.

At the beginning of the process, an operator has a unitary assembly consisting of the propulsion unit 14 and the rudder bearing 58. The operator also has the spacer 70 attached on the rudder bearing 58. As noted above, the upper part 38 of the mobile housing 16 of the propulsion unit 14 is mechanically connected to the outer ring 60 of the rudder bearing 58 with several screws 64. Moreover, the gasket 94 is already arranged around the shoulder 52 of the outer cylindrical surface 50.

During a first step, the operator introduces the spacer 70 from the outer zone 10 through the bore made in the hull element 4. Then, the operator fixes the first end 72 of the spacer 70 to the fixing flange 13 of the cylindrical seat 12. To do this, the operator may, for example, insert several bolts connecting mechanically the end 72 and the fixing flange 13. The operator can then weld the end 72 to the fixing flange 13, to ensure an even stronger fastening.

During a second step, the operator introduces the integral assembly consisting of the propulsion unit 14 and the rudder bearing 58, so as to cause the end cylinder 54 to slide in the through hole 80 of the spacer 70 until the outer ring 66 of the rudder bearing 58 comes fully in contact against the flat surface of the fastening flange 78. Thanks to the end cylinder 54, a simple pivoting of the outer ring 66 makes it possible to match the holes 68 and the perforations 84. The operator then places the locking element 86 so that the holes 68 and 88 face each other.

In a third and final step, the operator introduces the studs inside the perforations 84 and the holes 68 and 88. The operator then tightens the studs with a predetermined tightening torque.

At the end of this process, the propulsion unit 14 is mechanically connected to the hull element 4 of the ship 2, by a pivoting link with a shaft 82. Furthermore, the power system mounting method is relatively simple, in particular due to the fact that no element must be introduced from the inner zone 8 of the hull element 4. Similarly, the dismantling and maintenance operations in dry docks are facilitated.

It is possible to deliver directly to the shipyard a power system comprising both the elements providing the propulsion function and the elements providing the propulsion orientation function. This results in storage savings. This also results in better reliability, since the propulsion and propulsion orientation functions on the delivered power system have both been tested.

By adapting the arrangement and the orientation of the rudder bearing 58, the latter is brought closer to the mobile housing 16 and the sealing gasket 94. This reduces the leverage effect appearing after small rotations of the propulsion unit 14 around the longitudinal and transverse directions of the ship 2. This results in better resistance of the rudder bearing 58, and a longer service life of the sealing gasket 94.

It is also possible to use the same mobile housing 14 for a propulsion unit to be arranged on the port side of the ship and for a propulsion unit to be arranged on its starboard side. The integral assembly consisting of a propulsion unit fixed to its rudder bearing is fixed to a strut of a different design. This results in better adaptability of the power system without, however, leading to an increase in manufacturing and design costs, this improved adaptability resulting in particular in improved hydrodynamics.

What we claim is:

1. A system for mounting on a marine vehicle, comprising a propulsion unit,
fittings for fastening the system to a hull element of the vehicle, and
a rudder bearing mechanically connecting the propulsion unit with the fittings, wherein the fittings are designed such that, when the system is mounted on the hull element, a plane of the rudder bearing is inclined at an angle $\alpha$ with respect to a plane defined by a longitudinal axis and a transverse axis of the marine vehicle, and
wherein the fittings include a spacer in the form of a cylinder trunk comprising a first plane end perpendicular to its axial direction and a second end oblique relative to its axial direction, the spacer being fixed by its second end to the rudder bearing.

2. The system according to claim 1, wherein the smallest distance (a) between the first end and the second end is between 400 mm and 1200 mm.

3. The system according to claim 1, wherein the spacer has at its first end a ring front face for attachment to a fastening flange integral with the hull element of the vehicle.

4. The system according to claim 1, wherein the spacer includes at its second end a fastening flange connected to an inner ring or an outer ring of the rudder bearing by means of several studs having a threaded end inserted into corresponding holes.

5. The system according to claim 1, wherein the rudder bearing comprises an inner ring and an outer ring, one of the rings being integral with the propulsion unit, the other ring being integral with the fittings, the rudder bearing further comprising a sealing gasket radially located between the inner ring and the outer ring.

6. The system according to claim 1, wherein the rudder bearing comprises an inner ring and an outer ring, the inner ring being integral with the propulsion unit, the outer ring being integral with the fittings.

7. The system according to claim 6, wherein the propulsion unit has an upper end surface which is in contact with the inner ring, the inner ring having several through holes, the upper end surface having several blind holes, each blind hole being arranged facing a through hole, several screws being inserted into the through holes and the blind holes to secure the rudder bearing to the propulsion unit.

8. The system according to claim 1, wherein the angle $\alpha$ is between 2° and 10° with respect to the plane defined by the longitudinal axis and the transverse axis of the vehicle.

9. A method of mounting a system according to claim 1, to a hull element of a marine vehicle, wherein the system is inserted from the outside of the hull element, and then the fittings are used to fasten the power system to the hull element.

10. The system according to claim 1, wherein the propulsion unit further comprising a propeller axis and a radial direction of the propeller axis has an angle $\beta$ relative to the plane of the rudder bearing.

11. The system according to claim 10, wherein the angle $\beta$ is between 0° and 10°.

\* \* \* \* \*